United States Patent [19]

Sperling et al.

[11] Patent Number: 4,757,943
[45] Date of Patent: Jul. 19, 1988

[54] METHOD AND APPARATUS FOR CONTROLLING THE TEMPERATURE OF A LIQUID

[75] Inventors: Jac K. Sperling; Arthur J. Sable, both of Boulder, Colo.; D. Clark Everest, III, Park City, Utah; John A. Ciciora, Denver; Jerry H. Polson, Boulder, both of Colo.

[73] Assignee: Naiad Company USA, Boulder, Colo.

[21] Appl. No.: 866,567

[22] Filed: May 22, 1986

Related U.S. Application Data

[63] Continuation-in-part of Ser. No. 685,793, Dec. 24, 1984, abandoned.

[51] Int. Cl.⁴ .............................................. G05D 23/12
[52] U.S. Cl. ................................. 236/12.12; 137/599; 137/884; 251/118; 251/129.17
[58] Field of Search ....................... 236/12.12; 137/599, 137/884, 606; 251/118, 129.17, 129.19, 335.2

[56] References Cited

U.S. PATENT DOCUMENTS

| | | | |
|---|---|---|---|
| 3,740,019 | 6/1973 | Kessell et al. | 251/129.17 |
| 4,195,662 | 4/1980 | Göttel | 251/129.17 |
| 4,359,186 | 11/1982 | Kiendl | 236/12.12 |
| 4,558,844 | 12/1985 | Donahue, Jr. | 251/118 |
| 4,635,844 | 1/1987 | Barrett, Sr. et al. | 236/12.12 |

*Primary Examiner*—Harry B. Tanner
*Attorney, Agent, or Firm*—Sheridan, Ross & McIntosh

[57] ABSTRACT

A liquid temperature controlling method and apparatus are provided in which on/off valves are utilized. The on/off valves are housed in a compact manifold assembly having a number of channels through which hot and cold water flows to and from the valves. Each of the valves communicates with an orifice, with each orifice communicating with the hot water valves being of a different size to produce binary flow patterns of water exiting the hot water associated orifices and valves. Similarly, each of the orifices communicating with a cold water valve is of a different size so that the flow rate of water from each cold water associated orifice is related in a binary manner to the flow rates through the other cold water associated orifices and valves. Because of the greater viscosity of the hot water, it is preferable that the hot water associated orifices be of a smaller size than corresponding cold water orifices. The opening/closing of the valves is controlled using information stored in memory. The programmed information correlates valve openings with information relating to water temperature. When there is a difference between actual and desired temperatures, one or more different combinations of valves can be opened in a predetermined manner without cycling through all possible valve combinations defined between the current combination of valve openings and the next combination of valve openings whereby the difference between the actual and desired temperatures is rapidly reduced.

17 Claims, 6 Drawing Sheets

METHOD AND APPARATUS FOR CONTROLLING THE TEMPERATURE OF A LIQUID

This is a continuation-in-part of Ser. No. 06/685,793 filed on Dec. 24, 1984 abandoned.

FIELD OF THE INVENTION

The present invention relates to a method and an apparatus for controlling the temperature of a liquid and, in particular, to a system for monitoring and regulating water temperature under computer control.

BACKGROUND INFORMATION

Control systems have been previously advanced for regulating the flow of water or other liquids. In U.S. Pat. No. 4,420,811 to Tarnay et al., issued Dec. 13, 1983, and entitled "Water Temperature and Flow Rate Selection Display and Control System and Method," a computer-controlled water temperature and flow rate system is disclosed. This system is characterized by the use of two proportional valves. One valve is used to receive hot water while the second valve is used to receive cold water. The valve openings can be incrementally adjusted using stepper motors. A single mixing valve used in a temperature control system is disclosed in U.S. Pat. No. 4,322,031 issued to Gehlert on Mar. 30, 1982, and entitled "Control for Sanitary Mixing Valve." A sensor detects the temperature of the water outputted from the mixing valve and a programmed microprocessor is used in controlling the temperature of the water outputted by the mixing valve. A mixing unit for a temperature-volume controlled system is described in U.S. Pat. No. 3,721,386 issued Mar. 20, 1973, to Brick et al. and entitled "Temperature-Volume Controlled Mixing Valve." A desired temperature of water is compared with the actual temperature of the water to produce a control signal for controlling the operation of a motor connected to the mixing unit. None of these liquid or water systems utilizes a binary arrangement of on/off valves for controlling the temperature of water.

In systems for controlling the flow of one or more gases, it is known to arrange a number of on/off valves in a parallel manner. In U.S. Pat. No. 3,905,394 to Jerde issued Sept. 16, 1975, and entitled "Flow Control System," a system for controlling the flow of gas, not liquid, is disclosed. Gas from a source at a predetermined pressure and temperature is supplied to a number of valves. Each of the valves communicates with an orifice, with each of the orifices being of a different size and having a predetermined binary relationship relative to the other orifices. For proper operation, the flow rate of both the inputted and the outputted gas is equal to or greater than the sonic rate. The flow rate of the output gas is monitored by a controller, which is used in controlling the opening of the valves. There is no monitoring and controlling of the temperature of the output gas. Another gas system that is used to control the flow rate of gas to a demand line is shown in U.S. Pat. No. 3,437,098 issued Apr. 8, 1969, to Stark et al. and entitled "System of Automatic Controls for Gas Mixing." This gas system also utilizes on/off valves, but in controlling the opening of the valves, a switch arm can only be moved in one step increments. Consequently, it may be necessary to step through a number of valve positions before the desired states of the on/off valves are reached. An apparatus for regulating the ratio of mixing of two gas flows while maintaining a constant overall flow rate is described in U.S. Pat. No. 3,886,971 issued June 3, 1975, to Lundsgaard et al. and entitled "Apparatus for Regulating the Ratio of Mixing of Two Fluid Flows." In this apparatus, a number of on/off valves are provided with flow resistors connected thereto which are used to vary the volume of fluid flow therethrough. Input of gas to the valves is under the control of a computer or an A/D converter. There is no monitoring of the output flow of gas. The valves are arranged in a parallel manner while the flow resistors are arranged according to a binary pattern whereby the volume of gas through one flow resistor has a binary relationship to the volume of gas through the remaining flow resistors. The flow resistors are pieces of tubing of identical inside diameter, and each has a predetermined length to achieve a binary relationship among the gas flow rates through the tubing pieces.

In addition to water temperature control systems and gas flow rate control systems, there are numerable other control systems such as disclosed in U.S. Pat. No. 4,384,462 issued Mar. 24, 1983, to Overman et al. and entitled "Multiple Compressor Refrigeration System and Controller Thereof." However, such known systems are not directed to efficiently and effectively controlling the temperature of water using on/off valves arranged according to a binary pattern and do not utilize the features of the present invention.

As can be appreciated from the foregoing prior art, there are many known systems that monitor and/or control the temperature of a liquid. There are also prior art gas systems that utilize on/off valves arranged in a binary pattern to control the flow rate of one or more gases. However, each such system fails to fully satisfy all of the objectives sought in a water temperature control system. Known systems for controlling temperature of water have utilized two proportional-type valves or a single mixing valve. The use of proportional valves significantly adds to the expense of the system and increases the response time associated with reaching a desired water temperature. Further expense ensues when it is necessary to replace the proportional valves because of wear. The use of on/off valves in the present invention reduces the expense associated with the water temperature control system and decreases the response time. Additionally, none of the known binary-related systems has been able to achieve the compact configuration of the present invention which results in reduced manufacturing cost, reduced response time and minimal space occupied by the system when it is held in position and attached to hot water and cold water pipes located in a house or other building.

SUMMARY OF THE INVENTION

The present invention is directed to achieving a number of objectives in a water temperature controlling system including accurate and rapid temperature regulation, together with reliable operation, while providing a compact, inexpensive system. Such objectives are satisfied by the combination of elements and unique arrangement thereof in the present invention.

The apparatus of the invention includes a compact manifold assembly having a number of channels through which water is able to flow. The channels communicate with a number of on/off valve assemblies. In one embodiment, there are six on/off valve assemblies for receiving relatively hot water and six on/off valve assemblies for receiving relatively cold water. Each of the valve assemblies includes a valve opening, which is either fully closed or fully opened. The apparatus also includes a number of orifices, with each orifice communicating with a valve opening. In the preferred embodiment, each orifice is formed in an orifice plate and the orifice plate and the valve opening are one integrated piece. Each orifice associated with a hot water valve assembly is of a different size than the other orifices associated with hot water valve assemblies. Similarly, each of the orifices associated with a cold water valve assembly is of a different size than the other of the orifices associated with cold water valve assemblies. Preferably also, each of the orifices communicating with a hot water valve assembly is smaller in size than the corresponding orifice communicating with the cold water valve assembly due to the lesser viscosity of the hot water. For example, the smallest orifice in communication with a hot water valve assembly is smaller in size than the smallest of the orifices communicating with the cold water valve assemblies. Further, a binary flow relationship is established through the use of different sized orifices. That is, there is a binary relationship among the flow rates of water through each of the hot water associated orifices and a binary relationship among the flow rates of water through each of the cold water associated orifices, whereby the water outputted by the valve assemblies can be regulated for controlling the temperature of the outputted water. In that regard, the opening/closing of the valve assemblies is controlled by means of solenoid assemblies, which are, in turn, controlled by an electronic controller. The solenoid assemblies are directly supported by the manifold assembly so that the overall compactness of the apparatus is maintained. Further contributing to the compact nature of the apparatus is the preferred arrangement of the valve assemblies. In particular, a number of hot water valve assemblies, as well as a number of cold water valve assemblies, are arranged in a serial/parallel manner in which water is supplied in a direction from a first valve assembly to succeeding valve assemblies.

In connection with the actual controlling of the water temperature, the electronic controller preferably includes a microprocessor and a memory. The memory stores information, which can be described as being in table form, that correlates various combinations of valve openings with amounts of hot water or, alternatively, amounts of cold water. In one embodiment in which six hot water and six cold water valve assemblies are utilized, there are 64 different valve positions whereby each of such positions corresponds to a different proportion of hot and cold water and, therefore, a different water temperature.

The hot water is supplied to designated channels while cold water is supplied to other designated channels. The water inputted to the apparatus may vary considerably in pressure and/or velocity, which would depend upon controls at a location remote from the apparatus, either in the building itself that houses the apparatus or at some other location or building. The relatively hot water and the relatively cold water inputted to the apparatus may also vary over a temperature range. The inputted water flows adjacent to the valve assemblies and, depending upon which of such valve assemblies are opened, output channels will carry the water that flows through the opened valve assemblies to a common output channel. The common output channel is used in carrying the water to a bath tub faucet, shower head outlet, sink, or other suitable output unit. Communicating with the common output channel is a temperature sensor, which is received through a bore formed in the manifold assembly and which communicates with the common output channel. The user of the apparatus selects a desired water temperature using available input or control elements. The electronic controller, including the microprocessor and memory, is used in comparing the sensed temperature of the water with the selected, desired temperature. After the comparison, valve assemblies are opened in a predetermined manner using information stored in the memory table to minimize any difference between the actual and desired temperatures. In the preferred embodiment, cycling through a number of intermediate steps or positions corresponding to opened valve combinations is not necessary. Rather, depending upon the magnitude of the difference between the actual and desired temperatures, a number of positions in the table can be bypassed in order to move rapidly and precisely towards a combination of opened valves that results in a substantial correspondence between actual and desired water temperatures.

In view of the foregoing summary, it is readily seen that a number of salient features are incorporated in the inventive apparatus. Relatively inexpensive, durable, and easily replaceable on/off valves are utilized, instead of relatively expensive proportional valves, so that each valve can be independently opened for use in controlling the temperature of the water exiting the valves. In that regard, the on/off valves used in the apparatus are commercially available. The on/off valves and the channels with which they communicate are arranged in a manner to minimize space requirements, and to reduce the transport time for delivery of the water at the selected temperature including between the common output channel and the temperature sensor and between the temperature sensor and the outlets, while at the same time providing sufficient space for proper mixing of the hot and cold water. The orifice plates are integrated with the valve assemblies to enhance the compact nature of the system. Solenoid assemblies are advantageously mounted to an outer surface of the manifold assembly to further contribute to the compact configuration of the apparatus. The control aspects of the invention ensure rapid response to a selected temperature since intermediate valve combinations can be bypassed in favor of one or more valve combinations that will more quickly achieve the selected temperature. Additional advantages will be noted and discussed in connection with the following detailed description of the embodiments of the invention.

DETAILED DESCRIPTION OF THE EMBODIMENTS

Figure 1A:
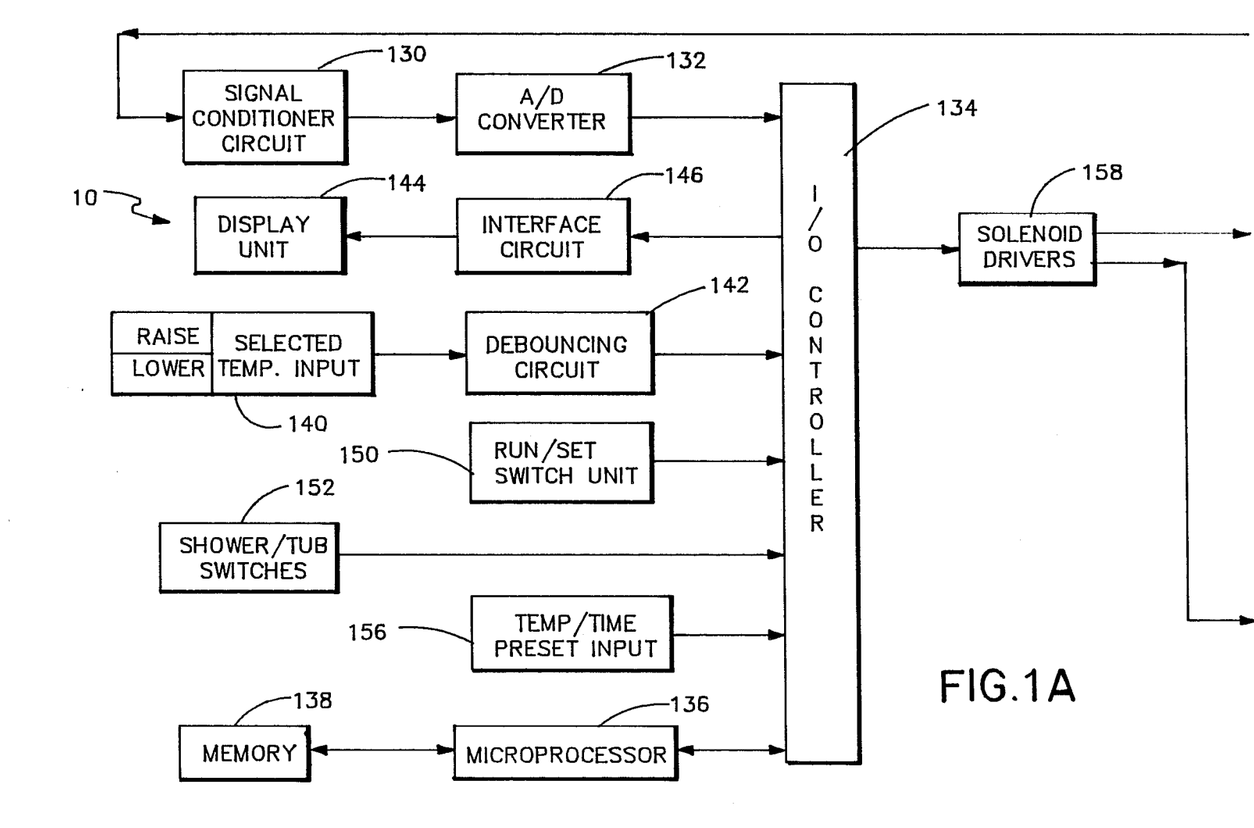
FIGS. 1A–1B are block diagrams of the present invention diagrammatically illustrating the electronic controller and the manifold assembly.
Figure 1B:
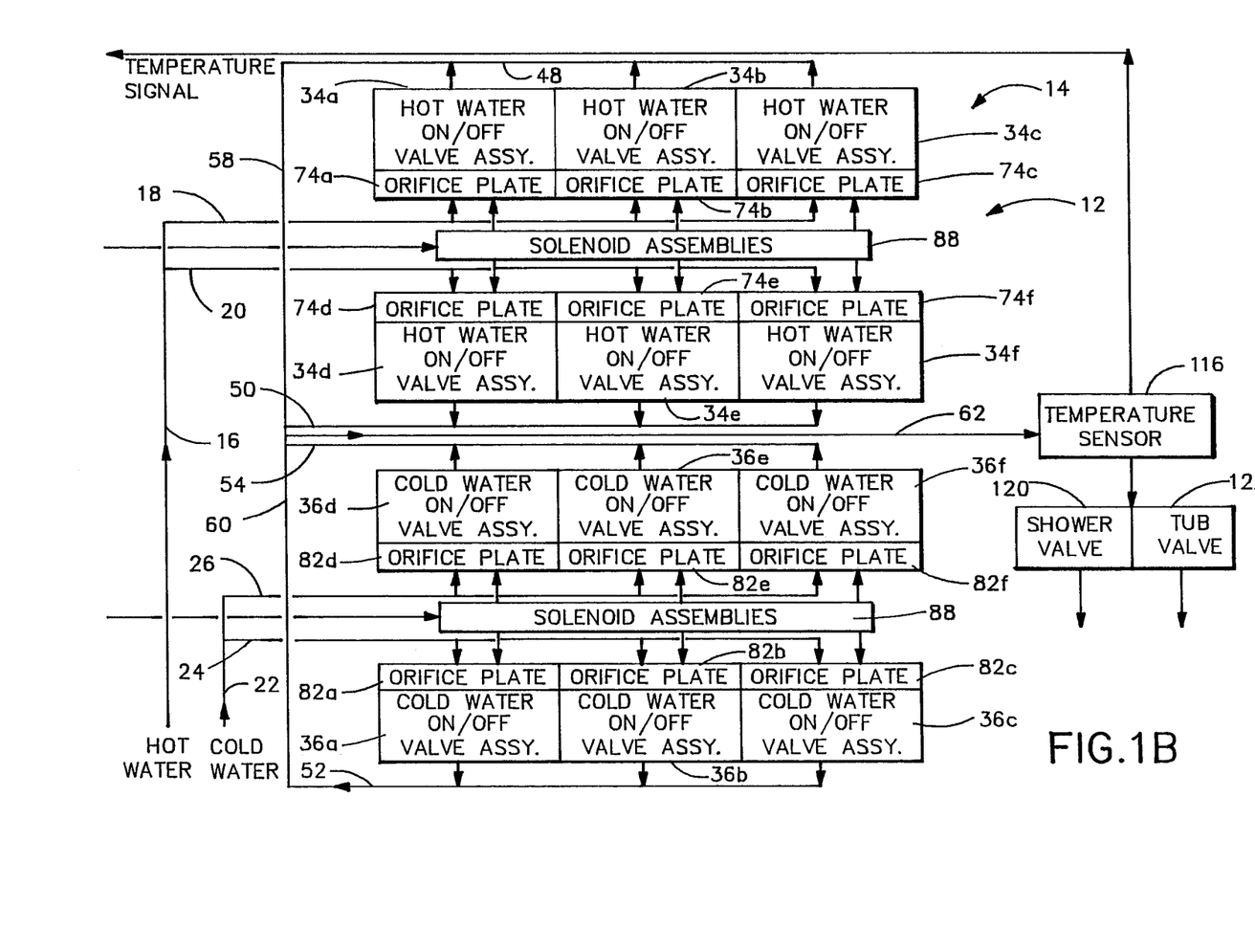

In accordance with the present invention, a liquid, preferably water, temperature control system is provided that includes an electronic controller 10 and a manifold assembly 12, as illustrated schematically in FIGS. 1A–1B. The electronic controller 10 and the manifold assembly 12 cooperate to monitor and regulate the temperature of water that is outputted from the system to a tub/sink and/or shower head, or other suitable outlet. The manifold assembly 12 is used in delivering the water at the desired temperature to the outlet while the electronic controller 10, by means of a stored program and a table of information, controls the proportion of hot water to cold water that is to be outputted by the manifold assembly 12.

With reference to FIGS. 3–7, as well as FIG. 1B, the manifold assembly 12 includes a valve manifold 14, which is an integral member having a number of channels through which the water flows. The valve manifold 14, in one embodiment, defines a first side for receiving relatively hot water and a second side for receiving relatively cold water. With respect to the first side, a hot water input line 16 is formed in the valve manifold 14. The input line 16 communicates with a pair of input channels 18, 20, each of which carries the hot water along the longitudinal extent of the valve manifold 14. Similarly, on the side for receiving cold water, the valve manifold 14 includes a cold water input line 22, which communicates with or branches off into a pair of cold water input channels 24, 26. Each of the cold water input channels 24, 26 is used in carrying cold water along the longitudinal extent of the valve manifold 14. Each of the two input lines 16, 22 preferably communicates with a check valve so that water flow is only in the desired direction. The input lines 16, 22 branch into the two input channels 18, 20 and 24, 26, respectively to facilitate the making of channels in the valve manifold 14 for carrying water and to assure that input water-carrying channels do not overlap with output water-carrying channels. In such a case, to avoid overlapping, the valve manifold 14 would have to be enlarged and the compactness of the valve manifold 14 would thereby be diminished.

Figure 3:
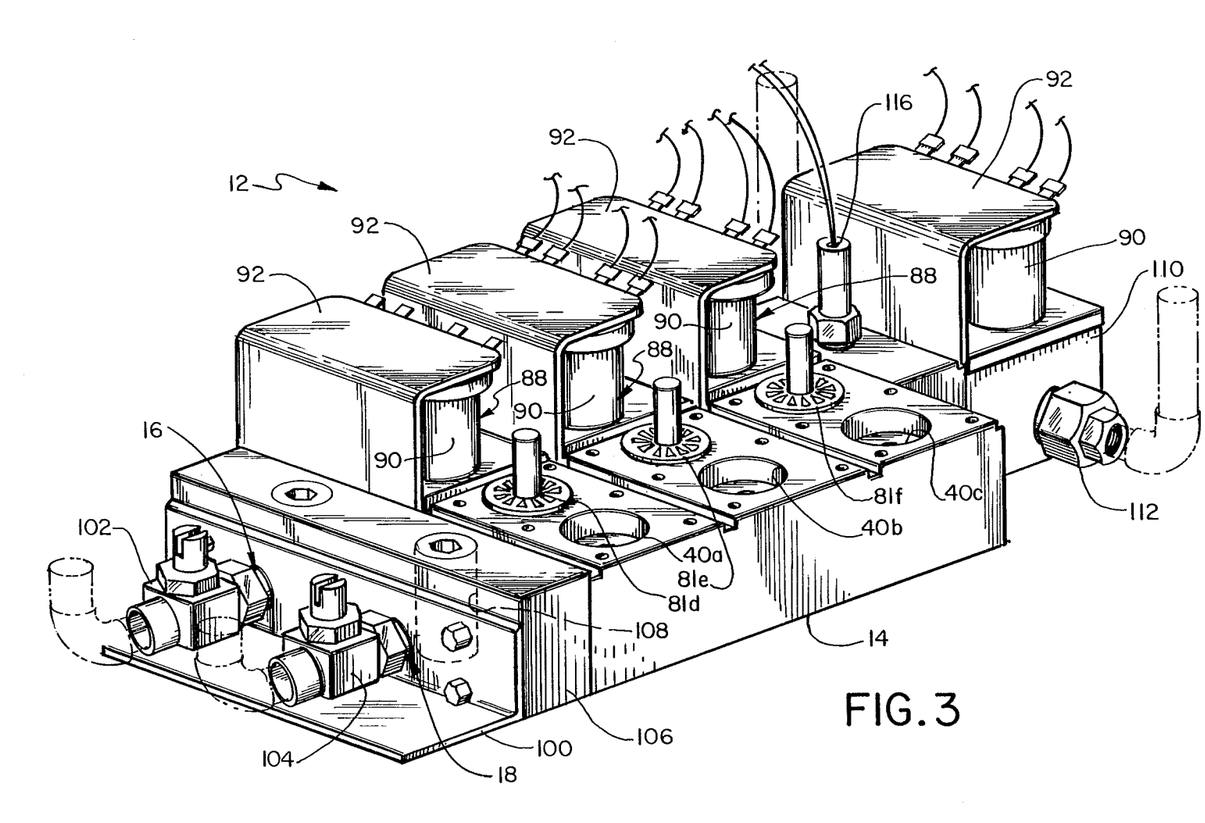
FIG. 3 is a perspective view of the manifold assembly and solenoid assemblies of the present invention.
Figure 4:
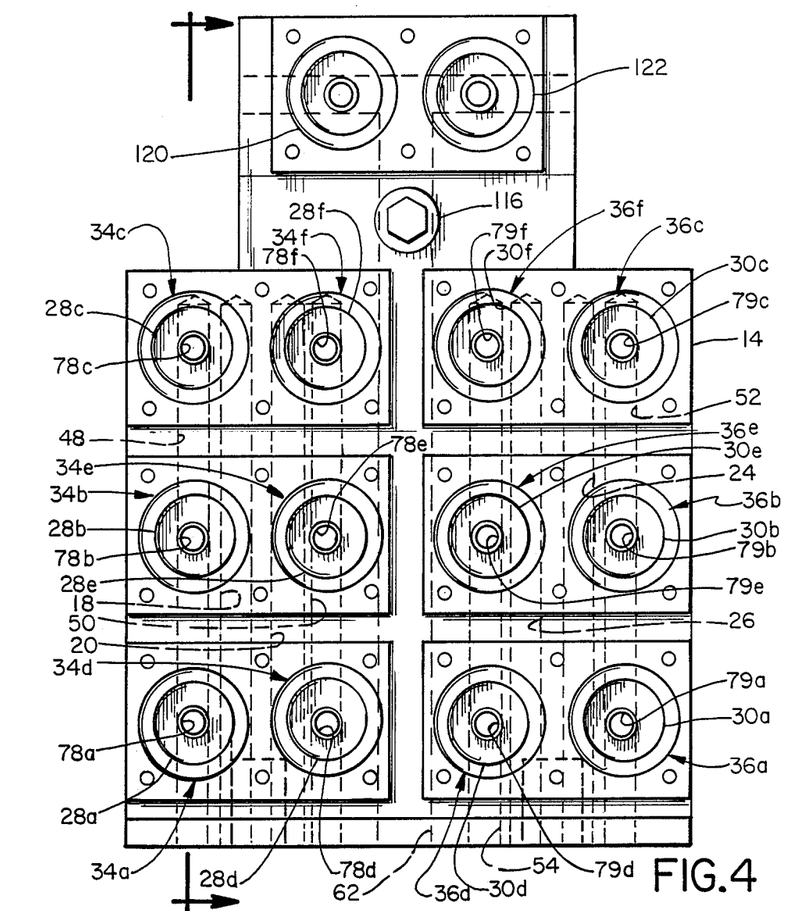
FIG. 4 is a top view of the valve manifold and outlet manifold showing the channels in phantom lines.
Figure 5:
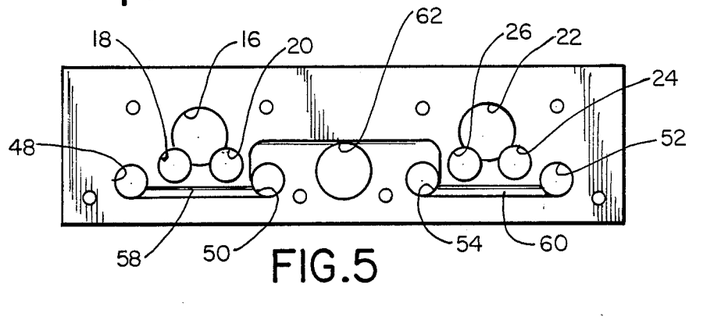
FIG. 5 is a front view of the valve manifold showing the arrangement among the channels.
Figure 6:
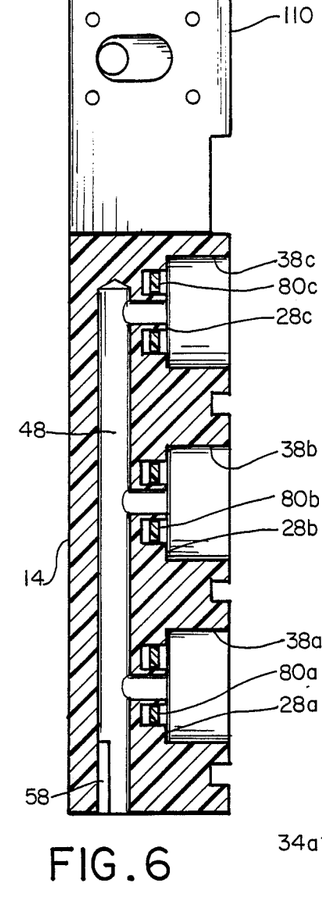
FIG. 6 is a side view of the valve manifold showing an output channel, valve seats and orifice plates.

The valve manifold 14 also includes a number of hot water valve seats 28a–28f and a number of cold water valve seats 30a–30f. The hot water valve seats 28a–28c are also illustrated in FIG. 6. Each of the valve seats 28, 30 is part of a valve assembly. In the embodiment illustrated in FIGS. 1B and 4, there are six hot water valve assemblies 34a–34f and a like number of cold water valve assemblies 36a–36f. Each of the hot and cold water valve assemblies 34, 36 has an on/off valve configuration in which the valve is either fully opened or fully closed. Each of the input channels 18, 20, 24, 26 communicates with one of the valve assemblies 34, 36. In the preferred embodiment, each of the valve assemblies 34 includes a hot water related bore 38a–38f and each of the valve assemblies 36 includes a cold water related bore 40a–40f. Hot water associated bores 38a–38c are seen in FIG. 6 while cold water associated bores 40a–40c are illustrated in FIG. 3. Each of the input channels 18, 20, 24, 26 communicates directly with one of the valve assemblies 34, 36, as best seen in FIG. 4.

Before discussing the other parts of the valve assemblies 34, 36, remaining portions of the valve manifold 14 are described. In particular, the valve manifold 14 also includes a number of output channels for carrying water away from the valve assemblies 34, 36. The first hot water output channel 48 communicates with each of the hot water on/off valve assemblies 34a–34c. Similarly, a second hot water output channel 50 communicates with each of the hot water on/off valve assemblies 34d–34f. Similarly, a first cold water output channel 52 communicates with each of the cold water on/off valve assemblies 36a–36c while a second cold water output channel 54 communicates with the remaining cold water on/off valve assemblies 36d–36f. Each of these output channels 48–54 is preferably located directly below the respective valve openings 78, 79 of the valve assemblies 34, 36 with which they communicate, as illustrated in FIG. 4. This arrangement also adds to the desired compactness of the valve manifold 14.

Each of these output channels 48–52 communicates directly with one of two linking output channels 58, 60. The linking output channels 58, 60 are located on the input side of the valve manifold 14. The linking output channel 58 is substantially perpendicular to each of the output channels 48, 50 and receives the hot water from these two channels. The linking output channel 60 is substantially perpendicular to each of the output channels 52, 54 and receives the cold water from these two channels.

A common output channel 62 is also formed in the valve manifold 14 for carrying water along the longitudinal extent of the valve manifold 14. The common output channel 62 communicates with each of the linking output channels 58, 60 and carries combined hot and cold water away from the valve manifold 14. As can be understood from FIG. B, the flow of the water in the common output channel 62 is in the same direction as the flow in the input channels 18, 20 and 24, 26, while the flow in the output channels 48–54 is in a direction opposite that of the flow in the input and common output channels.

Figure 7:
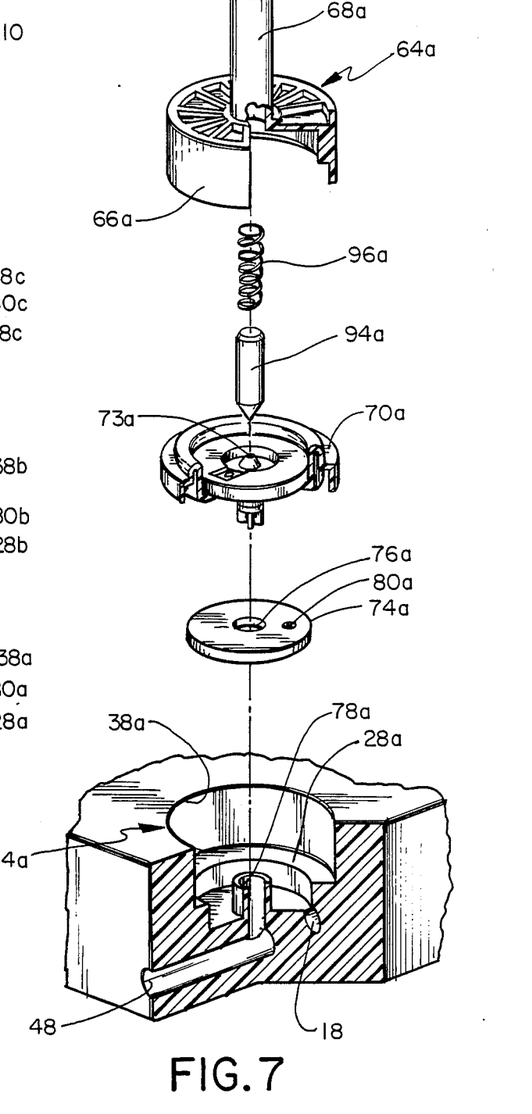
FIG. 7 is an exploded view showing a valve assembly, orifice plate, and a portion of a solenoid assembly.

Referring now to FIGS. 6 and 7, as well as FIG. 1B, the valve assemblies 34, 36 will be described. Initially it is noted that each of the valve assemblies 34, 36 has the same physical configuration and a description of any one of the 12 valve assemblies 34, 36 is considered to be a description of the other valve assemblies 34, 36. In that regard, the hot water on/off valve assembly 34a, in addition to having a valve seat 28a and a bore 38a, includes a valve cover 64a, which is comprised of a cylindrical receptacle 66a and a stem 68a integrally formed with the receptacle 66a. Each receptacle 66a is of a size to fit within the bore 38a formed in the valve manifold 14, which is used in housing the valve seat 28a. That is, the top of the receptacle 66a is substantially flush with an outer surface of the valve manifold 14, with the full length of the stem 68a protruding above the surface of the valve manifold 14. A seal member 70a having a diameter substantially equal to the inner diameter of the receptacle 66a is adapted to be tightly held in the receptacle 66a. The seal member 70a is preferably made of a flexible, sealing material, such as rubber, and has one or more holes. In this embodiment, a plate 72a is held by the seal member 70a and includes an opening 73a formed through about the center portion of the plate 72a. The opening 73a is aligned with the hole formed in the seal member 70a.

In the preferred embodiment, a hot water associated orifice plate 74a is provided adjacent to the valve seat 28a and to the seal member 70a. The orifice plate 74a has a center hole 76a that is located about the extending portion or tube of the valve seat 28a, which defines a valve opening 78a. The orifice plate 74a includes an orifice 80a which is formed at the periphery of the orifice plate 74a through a portion thereof. In one embodiment, each orifice plate 74 is integrally molded or formed with a valve seat 28. In this manner, a proper seal is established and water is able to only pass through the orifice 80, and not through or around any portions of the orifice plate 82 so that, when the valve assembly 34 is opened, only hot water through the orifice 80 passes through the valve opening 78.

Each of the hot water valve assemblies 34a-34f has associated with it an orifice plate 74a-74f, respectively. Similarly, each of the cold water on/off valve assemblies 36a-36f has associated with it a valve cover 81a-81f and an orifice plate 82a-82f, respectively. Each of the cold water associated orifice plates includes an orifice 84a-84f, respectively. Additionally, in the preferred embodiment, at least some of the orifice plates 74a-74f and 82a-82f include more than one orifice in the same orifice plate. This is necessary because the required size of some of the orifices is so large that a single orifice plate is not large enough to accommodate such a sized orifice. Consequently, these larger orifices are formed using two or more relatively smaller orifices in the same orifice plate.

In the preferred embodiment, the sizes of each of the hot water associated orifices 80a-80f are determined so that the flow rate or amount of hot water exiting one orifice is in a binary relationship relative to the flow rates of water through the other of the hot water associated orifices. That is, for example, the flow rate through the orifice 80b is twice that of the flow rate of hot water through the orifice 80a, while the flow rate of hot water through the orifice 80c is four times that through the orifice 80a, and so on, with the flow rate of water through the orifice 80f being 32 times greater than the flow rate through the orifice 80a. Similarly, each of the sizes of the cold water associated orifices 84a-84f is determined to provide a binary relationship among the cold water associated orifices. Consequently, the flow rate of cold water through the orifice 84b is twice that through the orifice 84a, and so on, with the flow rate of cold water through the orifice 84f being 32 times that of the flow rate through the orifice 84a. By way of example only, if cold water flows through the cold water associated orifice 84f at a flow rate of approximately 1.5 gallons per minute, then the flow rate through the orifice 82e is approximately half of that flow rate or 0.75 gallons per minute. In addition, an important feature of the present invention is the utilization of hot water associated orifices 80a-80f that are smaller in size than their corresponding cold water associated orifice 84a-84f, respectively. That is, the smallest of the hot water associated orifices 80a is smaller in size than the smallest of the cold water associated orifices 84a and so on with the largest of the hot water associated orifices 80f being smaller in size than the largest of the cold water associated orifices 84f. This relationship between the hot and cold water orifices is due to the fact that the relatively hot water has a greater viscosity and is able to flow at a relatively faster rate in comparison with the cold water, when both the hot and cold water are under the same pressure. Consequently, more hot water is able to pass through the same sized orifice in the same amount of time, in comparison with cold water flowing through the same sized orifice. In order to maintain the desired binary relationship and assure accurate combinations of valve openings in providing a desired temperature, it is important to determine and incorporate such different sized orifices.

In addition, in order to achieve the desired binary related flow rates using the orifices 80, 84, the sizes of the orifices themselves 80, 84 are not in a binary relationship. That is, the size of orifice 80f is not 32 times the size of orifice 80a. The necessary orifice sizes were obtained by testing and experimentation to ensure that the flow rates through the orifices 80, 84 are related in a binary manner and in doing so, such factors as the pressure of the water supplied to the building, the pressure of the water in the building itself, and the manifold size were considered.

In connection with the controlling of the valve assemblies 34, 36, solenoid assemblies 88 are employed. Preferably, an individual solenoid assembly is used with each valve assembly 34, 36. Each of the solenoid assemblies 88 is of the same configuration and includes, as illustrated in FIG. 3, a cylindrical-shaped housing 90, which is of a size to receive a stem 68 of a valve body 64. Each of the housings 90 is supported on the valve manifold 14 by means of a bracket 92 which is attached to a surface of the valve manifold 14. Each of the solenoid assemblies 88 also includes a plunger 94, with the plunger 94a associated with the valve assembly 34a being shown in FIG. 7. The plunger 94a, includes, as do the other plungers 94 associated with each of the valve assemblies 34, 36, a tip, which has a size for engaging the seal member 70a with which it comes in contact. When a solenoid assembly 88 is energized, the plunger 94 is caused to move away from its seal member 70. With the plunger 94 moved away from seal member 70, the pressure of the water against the seal member 70 causes the seal member 70 to be displaced away from the valve opening 78. When this occurs, the water through the orifice 80 or 84 is able to flow through the valve opening 78, in a direction substantially opposite the direction of the water through the orifice 80 or 84. Each solenoid assembly 88 also includes a spring 96 positioned in each of the stems 68a-68f. When the previously activated solenoid assembly of the solenoid assemblies 88 is no longer energized, the spring 96 thereof causes its associated plunger 94 to be returned to its position adjacent to the seal member 70. This movement of the plunger 94 also causes its associated seal member 70 to be moved to its closed position whereby water through the orifice 80 or 84 is unable to pass through the previously opened valve opening 78.

As can also be seen in FIG. 3, the manifold assembly 12 also includes a L-shaped inlet manifold 100 to which a pair of input connectors 102, 104 are fastened. A first input connector 102 is attached to the hot water pipe in a house or other building, which is utilizing the apparatus of the present invention. The second input connector 104 is attached to the pipe carrying the cold water. The inlet manifold 100 includes openings of a predetermined size through which the input connectors 102, 104 are sealingly connected.

The inlet manifold 100 is fastened to a strainer block 106, which includes filters 108 for filtering or removing particles or other contaminants from the hot and cold water being supplied to the apparatus. In the preferred embodiment, the strainer block 106 is connected on one of its sides to the inlet manifold 100, with a gasket therebetween, while the opposite side of the strainer block 106 is connected to the valve manifold 14, with a gasket positioned therebetween. The inlet manifold 100 and the strainer block 106 are connected to the valve manifold 14 by means of the same bolts. The strainer block 106 includes water pathways in alignment with the hot water input line 16 and the cold water input line 22.

The manifold assembly 12 further includes an outlet manifold 110 as an integral part thereof and to which a pair of output connectors 112 are sealingly attached. The first output connector 112 (not shown) is joined to pipe for carrying water to a shower head, for example, while the second output connector 112 is joined to pipe for carrying water to a tub faucet, for example. The outlet manifold 110 also has a bore formed through it which communicates with the common output channel 62. A temperature sensor 116 is received by the bore and is used to send a temperature signal to the electronic controller 10. In this location, the temperature sensor 116 is able to detect the temperature of the combined or mixed hot and cold water. For controlling the flow of water to the shower head or the tub faucet, a shower valve 120 and a tub valve 122 are provided with the outlet manifold 110. The valves 120, 122 are also on/off valves. The opening/closing of the valves 120, 122 is also controlled using the same type of solenoid assemblies 88 that are used in controlling the valve assemblies 34, 36, respectively. Such solenoid assemblies are mounted to the surface of the outlet manifold 110. It should be appreciated that outlets other than to a shower head or faucet could be utilized. Also, only one outlet or more than two outlets could be employed.

With reference to FIG. 1A again, the electronic controller 10 is described in greater detail. The electronic controller 10 includes a signal conditioner circuit 130, which is responsive to the temperature signal outputted by the temperature sensor 116. The function of the signal conditioner circuit 80 depends upon the kind of temperature sensor 116 that is employed, and the signal conditioner circuit 130 may, for example, act to provide cold junction compensation or linearize the temperature signal, as is well known to one skilled in the art. The conditioned temperature signal is applied to an A/D converter 132. After the temperature signal is converted to digital form by the A/D converter 132, in a typical embodiment, it is inputted to an I/0 controller 134 that communicates with certain peripheral-related devices and a microprocessor 136. More specifically, the electronic controller 10 further includes the microprocessor 136 and a memory 138. The memory 138 is accessed by the microprocessor 136 and stores an executable control program, as well as variable and permanent data, for use by the microprocessor 136 in monitoring and controlling the operation of the present invention.

The peripheral-related devices include a selected temperature input 140 whereby the user is able to select and input a desired or selected temperature for storage, using the I/0 controller 134 and the microprocessor 136. The desired temperature is stored for subsequent comparison with an actual or sensed temperature detected by the temperature sensor 116. In one embodiment, the selected temperature input 140 includes a first switch for increasing or raising the desired temperature while a second switch is used in order to lower or decrease the magnitude of the selected temperature. The output of the selected temperature input 140 is applied to a debouncing circuit 142 which is used to eliminate the transient switching inherent in the switches used to raise and lower the magnitude of the desired temperature. The selected water temperature established by the user can be stored in a register located in the microprocessor 136 for comparison with the actual temperature sensed by the temperature sensor 116 or, alternatively, the magnitude of the selected temperature can be stored in the memory 138 for later access and use by the microprocessor 136.

In conjunction with the selected temperature, the electronic controller 10 further includes a display unit 144 which is used to provide a visual display, when selected, of either the desired temperature selected by the user or the actual temperature of the water sensed by the temperature sensor 116. An interface circuit 146 provides the input to the display unit 144 and, in one embodiment, includes: a decoder for decoding the information received from the I/0 controller 134 in order to energize the proper LED segments of the display unit 144; a display driver circuit used to provide the necessary amplification of the digital signals relating to the displayed temperature; and a multiplexer which minimizes the circuitry required to provide a display of the temperature by controlling in a predetermined manner the desired inputs through the display driver circuit and the decoder so that the appropriate LED segments are not continuously lit.

The electronic controller 10 also includes a run/set switch unit 150 for providing a number of functions. When the switch unit 150 is in its off position, no water can be outputted from the valve assemblies 34, 36 or the valves 120, 122. The switch unit 150 also includes a set position in which the valve assemblies 34, 36 remain closed so that water is unable to flow through the valves 34, 36 or the valves 120, 122, but the display unit 144 is operating and displays the desired temperature selected by the user. In this position also, the switch unit 150 is operative so that the selected temperature can be changed by the user by means of activation of the input 140 for visual indication by the display unit 144. The switch unit 150 further includes a run position in which at least one of the shower valve 118 and tub valve 120 is opened and all of the hot water on/off valve assemblies 44 and all of the cold water on/off valve assemblies 46 are also operative. In this position, water flows from the shower head and/or tub faucet and the display unit 144 is able to visually indicate the actual water temperature detected by the temperature sensor 116.

Also inputted to the I/0 controller 134 are the outputs from shower/tub switches 152. These switches 152 enable the user to select either the shower head or the tub faucet as the output for the water from the outlet manifold 110. As can be readily understood, when the shower switch is selected, for example, the shower valve 120 is opened, while the tub valve 122 remains closed, for delivery of the mixed water to the shower head.

In the preferred embodiment, the electronic controller 10 also includes at least one temperature/time preset input 156. This input or feature allows the operator or user to input a desired temperature and/or a desired time into memory. Once in memory, the inputted temperature and/or time can be re-called from memory in controlling the temperature of the water and/or the time during which the water flows. To utilize this feature, the user activates or presses the input 156, which causes a temperature value to be displayed by the display unit 144. The value of the temperature displayed is that value which was previously stored in memory. To change the preset temperature value, the user activates or presses the temperature input 140. That is, to increase the value of the preset temperature, the raise switch of the input 140 is activated, while to decrease the value of the stored temperature the lower switch of the input 140 is activated, until the temperature to be preset or stored is reached and displayed. With the new preset temperature now stored in memory, the user is then able to select a preset time to be stored in memory. This is accomplished by again pressing the temperature/time preset input 156. This causes the previously stored time to be displayed. The time can be changed in 30 second intervals by pressing the selected temperature input 140. To increase the time to be stored, the raise switch is used, while the time is decreased by using the lower switch. After the selected time is reached and displayed, this time is stored in memory and the user is now able to initiate water flow through the shower valve 120 and/or the tub valve 122. In the preferred embodiment, a second temperature/time preset input is provided so that two sets of preset values can be stored for temperature and time. As can be understood, the time preset input is most beneficial when the tub is being filled with water and the user does not wish to watch or monitor the tub as it fills.

The electronic controller 10 also includes a number of solenoid drivers 158, with the number thereof corresponding to the number of valve assemblies. The drivers 158 receive their input from the I/0 controller 134. Each of the drivers 158 is triggered by a controlled input dictated by the control program. The outputs of the drivers 158 are applied to the solenoid assemblies 88. Each activated driver 158 causes its solenoid assembly 88 to be energized thereby moving its plunger 94 away from its associated seal member 70.

The operation of the present invention is now discussed. When power is initially applied to the apparatus after it is properly connected to the hot and cold water pipes, the control program begins to check for the existence of any inputs to the I/0 controller 134. The control program also monitors the temperature sensed by the temperature sensor 116. Assume, for example, that the initial state of valve assemblies includes valve assemblies 34f and 36a–36e (inclusive) being opened while the remaining valve assemblies 34a–34e (inclusive) and 36f are closed. As the flow of water through these opened valve assemblies begins, the temperature sensor 116 continues to be monitored by the electronic controller 10. The electronic controller 10 and the valve assemblies 34, 36 cooperate in providing a correspondence between the selected temperature and the actual water temperature. In the case in which a water temperature is not selected, the correspondence to be achieved is between the actual temperature and a default temperature, such as 100° F.

With regard to the flow of water when valve assemblies 34f and 36a–36e are opened, FIG. 1B illustrates, by means of the arrow heads, such flow through the various channels or water lines of the apparatus. The hot water from the building hot water supply pipe is carried by the hot water input line 16 through the inlet manifold 100 and the strainer block 106, where the water is filtered to remove unwanted particles. The hot water is diverted from the hot water input line 16 to the first and second hot water input channels 18, 20. Because the electronic controller 10 has only opened hot water on/off valve assembly 34f, the hot water is only able to pass through the valve assembly 34f. In connection with the flow through the opened valve assembly 34f, the plunger 94f is moved away from the seal member 70f and hot water is able to pass to and through the valve opening 78f in a direction substantially opposite that of the flow of the water through the orifice 80f. Since the hot water output channel 50 is in the path of the water exiting the valve opening 78f, and is substantially perpendicular thereto, the water flows to the hot water output channel 50. From the output channel 50, the hot water passes to the linking output channel 58, which is used to carry the water to the common output channel 62.

Similarly, with regard to the opened cold water on/off valve assemblies 36a–36e, the cold water is carried by the first and second cold water input channels 24, 26 adjacent to each of the cold water on/off valve assemblies 36a–36f. The cold water passes through the opened cold water on/off valve assemblies 36a–36e in the same manner as described in connection with the opened hot water on/off valve assembly 34f. Because valve assemblies 36a–36c are opened as well as valve assemblies 36d–36e, both first and second cold water output channels 52, 54 receive cold water which passes through the orifices 84a–84e. The cold water then flows to the linking output channel 60 and from there to the common output channel 62. From the common output channel 62, the water flows past the temperature sensor 116 to the input sides of the shower valve 120 and the tub valve 122.

Returning to the description of the controlling of water temperature, the control program, in addition to monitoring the temperature of the water, also determines whether other inputs have been provided by the user. In the case in which the shower switch of the switches 152 is turned on, the control program will, during its check of inputs, determine that the shower switch was turned on and will cause the shower valve 120 to open. This permits water flow through the shower head.

Assuming that the actual or current temperature of the water does not correspond to the water temperature selected by the user using the selected temperature input 140 and/or the temperature preset input 156, the electronic controller 10 acts to adjust this difference so that the desired temperature of the water is achieved. In controlling the temperature of the water, the I/O controller 134 controls the supplying of power to a selected number of the solenoid drivers 158. For those solenoid assemblies 88 communicating with the energized solenoid drivers 158, its plunger or plungers 94 are moved away from the seal member(s) 70 causing them to be moved away from the respective valve opening(s) 78. Depending upon which of the valve assemblies 34, 36 are opened, the temperature of the water changes and, based on the operation of the control program, the temperature moves towards the desired temperature set by the user or the default temperature.

With regard to determining which of the on/off valve assemblies 34a–34f and 36a–36f should be opened to achieve a particular water mixture and resulting water temperature, reference is made to the following Water Mixture Table I in which selected combinations of open/closed valves of the valve assemblies 34, 36 are provided.

TABLE I

| POSITION NO. | PROPORTION OF HOT WATER | WATER MIXTURE | | | | | | | | | | | |
|---|---|---|---|---|---|---|---|---|---|---|---|---|---|
| | | H1 34a | C1 36a | H2 34b | C2 36b | H3 34c | C3 36c | H4 34d | C4 36d | H5 34e | C5 36e | H6 34f | C6 36f |
| 1 | 0/63 | 0 | 1 | 0 | 1 | 0 | 1 | 0 | 1 | 0 | 1 | 0 | 1 |
| 2 | 1/63 | 1 | 0 | 0 | 1 | 0 | 1 | 0 | 1 | 0 | 1 | 0 | 1 |
| 3 | 2/63 | 0 | 1 | 1 | 0 | 0 | 1 | 0 | 1 | 0 | 1 | 0 | 1 |
| 4 | 3/63 | 1 | 0 | 1 | 0 | 0 | 1 | 0 | 1 | 0 | 1 | 0 | 1 |
| 5 | 4/63 | 0 | 1 | 0 | 1 | 1 | 0 | 0 | 1 | 0 | 1 | 0 | 1 |
| 6 | 5/63 | 1 | 0 | 0 | 1 | 1 | 0 | 0 | 1 | 0 | 1 | 0 | 1 |
| 7 | 6/63 | 0 | 1 | 1 | 0 | 1 | 0 | 0 | 1 | 0 | 1 | 0 | 1 |
| 8 | 7/63 | 1 | 0 | 1 | 0 | 1 | 0 | 0 | 1 | 0 | 1 | 0 | 1 |
| 9 | 8/63 | 0 | 1 | 0 | 1 | 0 | 1 | 1 | 0 | 0 | 1 | 0 | 1 |
| 10 | 9/63 | 1 | 0 | 0 | 1 | 0 | 1 | 1 | 0 | 0 | 1 | 0 | 1 |
| 11 | 10/63 | 0 | 1 | 1 | 0 | 0 | 1 | 1 | 0 | 0 | 1 | 0 | 1 |
| 12 | 11/63 | 1 | 0 | 1 | 0 | 0 | 1 | 1 | 0 | 0 | 1 | 0 | 1 |
| 13 | 12/63 | 0 | 1 | 0 | 1 | 1 | 0 | 1 | 0 | 0 | 1 | 0 | 1 |
| 14 | 13/63 | 1 | 0 | 0 | 1 | 1 | 0 | 1 | 0 | 0 | 1 | 0 | 1 |
| 15 | 14/63 | 0 | 1 | 1 | 0 | 1 | 0 | 1 | 0 | 0 | 1 | 0 | 1 |
| 16 | 15/63 | 1 | 0 | 1 | 0 | 1 | 0 | 1 | 0 | 0 | 1 | 0 | 1 |
| 17 | 16/63 | 0 | 1 | 0 | 1 | 0 | 1 | 0 | 1 | 1 | 0 | 0 | 1 |
| 18 | 17/63 | 1 | 0 | 0 | 1 | 0 | 1 | 0 | 1 | 1 | 0 | 0 | 1 |
| 19 | 18/63 | 0 | 1 | 1 | 0 | 0 | 1 | 0 | 1 | 1 | 0 | 0 | 1 |
| 20 | 19/63 | 1 | 0 | 1 | 0 | 0 | 1 | 0 | 1 | 1 | 0 | 0 | 1 |
| 21 | 20/63 | 0 | 1 | 0 | 1 | 1 | 0 | 0 | 1 | 1 | 0 | 0 | 1 |
| 22 | 21/63 | 1 | 0 | 0 | 1 | 1 | 0 | 0 | 1 | 1 | 0 | 0 | 1 |
| 23 | 22/63 | 0 | 1 | 1 | 0 | 1 | 0 | 0 | 1 | 1 | 0 | 0 | 1 |
| 24 | 23/63 | 1 | 0 | 1 | 0 | 1 | 0 | 0 | 1 | 1 | 0 | 0 | 1 |
| 25 | 24/63 | 0 | 1 | 0 | 1 | 0 | 1 | 1 | 0 | 1 | 0 | 0 | 1 |
| 26 | 25/63 | 1 | 0 | 0 | 1 | 0 | 1 | 1 | 0 | 1 | 0 | 0 | 1 |
| 27 | 26/63 | 0 | 1 | 1 | 0 | 0 | 1 | 1 | 0 | 1 | 0 | 0 | 1 |
| 28 | 27/63 | 1 | 0 | 1 | 0 | 0 | 1 | 1 | 0 | 1 | 0 | 0 | 1 |
| 29 | 28/63 | 0 | 1 | 0 | 1 | 1 | 0 | 1 | 0 | 1 | 0 | 0 | 1 |
| 30 | 29/63 | 1 | 0 | 0 | 1 | 1 | 0 | 1 | 0 | 1 | 0 | 0 | 1 |
| 31 | 30/63 | 0 | 1 | 1 | 0 | 1 | 0 | 1 | 0 | 1 | 0 | 0 | 1 |
| 32 | 31/63 | 1 | 0 | 1 | 0 | 1 | 0 | 1 | 0 | 1 | 0 | 0 | 1 |
| 33 | 32/63 | 0 | 1 | 0 | 1 | 0 | 1 | 0 | 1 | 0 | 1 | 1 | 0 |
| 34 | 33/63 | 1 | 0 | 0 | 1 | 0 | 1 | 0 | 1 | 0 | 1 | 1 | 0 |
| 35 | 34/63 | 0 | 1 | 1 | 0 | 0 | 1 | 0 | 1 | 0 | 1 | 1 | 0 |
| 36 | 35/63 | 1 | 0 | 1 | 0 | 0 | 1 | 0 | 1 | 0 | 1 | 1 | 0 |
| 37 | 36/63 | 0 | 1 | 0 | 1 | 1 | 0 | 0 | 1 | 0 | 1 | 1 | 0 |
| 38 | 37/63 | 1 | 0 | 0 | 1 | 1 | 0 | 0 | 1 | 0 | 1 | 1 | 0 |
| 39 | 38/63 | 0 | 1 | 1 | 0 | 1 | 0 | 0 | 1 | 0 | 1 | 1 | 0 |
| 40 | 39/63 | 1 | 0 | 1 | 0 | 1 | 0 | 0 | 1 | 0 | 1 | 1 | 0 |
| 41 | 40/63 | 0 | 1 | 0 | 1 | 0 | 1 | 1 | 0 | 0 | 1 | 1 | 0 |
| 42 | 41/63 | 1 | 0 | 0 | 1 | 0 | 1 | 1 | 0 | 0 | 1 | 1 | 0 |
| 43 | 42/63 | 0 | 1 | 1 | 0 | 0 | 1 | 1 | 0 | 0 | 1 | 1 | 0 |
| 44 | 43/63 | 1 | 0 | 1 | 0 | 0 | 1 | 1 | 0 | 0 | 1 | 1 | 0 |
| 45 | 44/63 | 0 | 1 | 0 | 1 | 1 | 0 | 1 | 0 | 0 | 1 | 1 | 0 |
| 46 | 45/63 | 1 | 0 | 0 | 1 | 1 | 0 | 1 | 0 | 0 | 1 | 1 | 0 |
| 47 | 46/63 | 0 | 1 | 1 | 0 | 1 | 0 | 1 | 0 | 0 | 1 | 1 | 0 |
| 48 | 47/63 | 1 | 0 | 1 | 0 | 1 | 0 | 1 | 0 | 0 | 1 | 1 | 0 |
| 49 | 48/63 | 0 | 1 | 0 | 1 | 0 | 1 | 0 | 1 | 1 | 0 | 1 | 0 |
| 50 | 49/63 | 1 | 0 | 0 | 1 | 0 | 1 | 0 | 1 | 1 | 0 | 1 | 0 |
| 51 | 50/63 | 0 | 1 | 1 | 0 | 0 | 1 | 0 | 1 | 1 | 0 | 1 | 0 |
| 52 | 51/63 | 1 | 0 | 1 | 0 | 0 | 1 | 0 | 1 | 1 | 0 | 1 | 0 |
| 53 | 52/63 | 0 | 1 | 0 | 1 | 1 | 0 | 0 | 1 | 1 | 0 | 1 | 0 |
| 54 | 53/63 | 1 | 0 | 0 | 1 | 1 | 0 | 0 | 1 | 1 | 0 | 1 | 0 |
| 55 | 54/63 | 0 | 1 | 1 | 0 | 1 | 0 | 0 | 1 | 1 | 0 | 1 | 0 |
| 56 | 55/63 | 1 | 0 | 1 | 0 | 1 | 0 | 0 | 1 | 1 | 0 | 1 | 0 |
| 57 | 56/63 | 0 | 1 | 0 | 1 | 0 | 1 | 1 | 0 | 1 | 0 | 1 | 0 |
| 58 | 57/63 | 1 | 0 | 0 | 1 | 0 | 1 | 1 | 0 | 1 | 0 | 1 | 0 |
| 59 | 58/63 | 0 | 1 | 1 | 0 | 0 | 1 | 1 | 0 | 1 | 0 | 1 | 0 |
| 60 | 59/63 | 1 | 0 | 1 | 0 | 0 | 1 | 1 | 0 | 1 | 0 | 1 | 0 |
| 61 | 60/63 | 0 | 1 | 0 | 1 | 1 | 0 | 1 | 0 | 1 | 0 | 1 | 0 |
| 62 | 61/63 | 1 | 0 | 0 | 1 | 1 | 0 | 1 | 0 | 1 | 0 | 1 | 0 |
| 63 | 62/63 | 0 | 1 | 1 | 0 | 1 | 0 | 1 | 0 | 1 | 0 | 1 | 0 |
| 64 | 63/63 | 1 | 0 | 1 | 0 | 1 | 0 | 1 | 0 | 1 | 0 | 1 | 0 |

As can be understood from the Water Mixture Table I, because six hot water valve assemblies 34a–34f and six cold water valve assemblies 36a–36f are incorporated in the illustrated embodiment, 64 different valve combinations are available. An opened valve assembly is represented or indicated by the binary number 1 while a closed valve assembly is represented or indicated by the binary number 0. Additionally, the binary arrangement in Table I requires that either the hot water valve assembly be opened or its corresponding cold water valve assembly be opened, but not both. For example, in the case of Position No. 28 in Table I, hot water valve assemblies 34b, 34d, and 34e are opened while the remaining hot water valve assemblies 34a, 34c, and 34f are closed. Conversely, cold water valve assemblies 36a, 36c, and 36f are opened while cold water valve assemblies 36b, 36d, and 36e are closed.

As can also be appreciated from the Water Mixture Table I, for Position No. 1, the valves through which cold water flows are all opened while the valves through which hot water flows are all closed. Consequently, the column of Table I illustrating the proportion or amount of hot water relative to the cold water indicates that no part of the total water flow includes hot water. At the opposite end of the Table I, all of the valves receiving hot water are opened while all the valves through which cold water flows are closed. For Position No. 64, the proportion of hot water to the total amount of water is 1, i.e., all of the water through the common output channel 62 is hot water.

The information correlating various combinations of opened valves and the proportion of hot water to cold water is stored in the memory 138 for access by the control program. In one method of controlling the opening/closing of valve assemblies 34, 36, to achieve a combination of valve assembly openings which provides the desired water temperature, the controlled program causes the combination of valve openings to be changed according to the steps disclosed in the flow diagram of FIG. 2. In particular, the method involves the determination of an error factor (EF), the magnitude and sign of which is used in determining which combination of valve assembly openings, in the Water Mixture Table I, that should be used to achieve a desired temperature.

Figure 2:
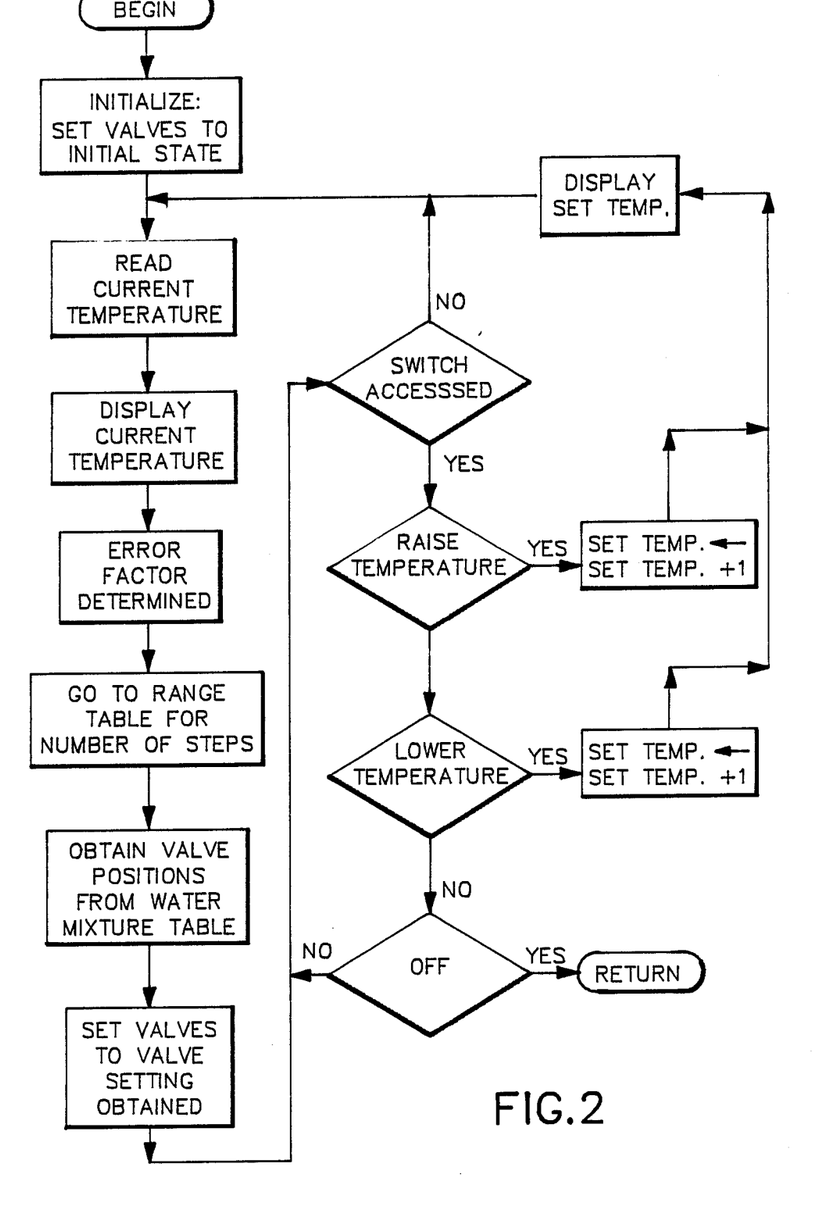
FIG. 2 is a flow diagram illustrating certain temperature monitoring and control steps associated with the present invention.

More specifically, with reference to FIG. 2, with the actual temperature of the water being sensed, the error factor (EF) can be determined. In one embodiment of the invention, EF = (set temperature) − (current temperature) − X ((current temperature) − (last current temperature)), where X is a coefficient that is known but varies depending upon the magnitude of the difference between the set temperature and the current temperature. With the error factor determined, the method of the present invention then arrives at which of the number of combinations of valve assembly openings should be utilized to reduce the difference between the actual temperature and the desired temperature. In arriving at such a combination of valve assembly openings, the control program determines how many positions or steps should be taken from the current position in the Water Mixture Table I and the direction of movement relative to the current position in the table. In accomplishing this step, a range table is formulated and stored in the memory 138. The range table consists of a number of error factors and a number of corresponding steps or positions to be taken or moved from the current position in the Water Mixture Table I. Each error factor or range of error factors has a corresponding number of steps in the defined range table, with the direction of each step also being provided.

By way of example only, for error factors having a value or magnitude of +4 to +6, the corresponding number of steps in the defined range table may be +5 steps in the "hotter" direction. This means that if the current combination of opened valve assemblies is, for example, defined by Position No. 32 and the error factor equals +6, then the number of steps to be taken to arrive at the next valve combination equals five steps in a "positive" direction, i.e. a greater proportion of hot water. Continuing with this example, since the number of steps being taken equals +5, the new position would be Position No. 37. To further illustrate the operation of the range table, for error factors having a value or range of +10 to +12, the corresponding number of steps in the range table may be +12. This means that if an error factor of +10 is determined, the next valve combination to be selected is +12 steps away in the Water Mixture Table I from the current position. In the case of the current position being Position No. 37, the next selected valve combination would be defined by Position No. 49.

Generally speaking, as can be seen from these two examples, the greater the value of the error factor, the greater is the number of steps to be taken to arrive at the next selected combination of valve assembly openings. It should also be understood that, in the case in which the error factors or range of error factors has a negative sign associated therewith, the next selected position number in the Water Mixture Table I is less than the current position number. After the next selected combination of valve assembly openings is established, the control program then causes a repeating of the steps shown in FIG. 2, starting with the reading of the current or actual temperature.

In another embodiment of the invention, greater numbers of valve assembly combinations or positions can be achieved with the same or fewer valve assemblies. With reference to the Water Mixture Table II set out below, 144 combinations of valve openings are achieved, even though only 8 valve assemblies are utilized. The increased number of valve combinations results because, for each two valves, all four possible combinations of valve openings/closings are utilized; instead of only two of the four possible combinations as found in Table I. Also, because of this capability, the valve combinations of Table II result in different flow rates of water through the common output channel 62, depending upon which valve combination is currently being used; whereas, the rate of water flow through the common channel 62 when the valve combinations of Table I are utilized, is substantially the same, regardless of which position number is being used.

TABLE II

| POSITION NO. | PROPORTION OF HOT WATER | H1 | C1 | H2 | C2 | H3 | C3 | H4 | C4 |
|---|---|---|---|---|---|---|---|---|---|
| 1 | 0/15 = .00 | 0 | 1 | 0 | 1 | 0 | 1 | 0 | 1 |
| 2 | 2/17 = .118 | 1 | 1 | 0 | 1 | 0 | 1 | 0 | 1 |
| 3 | 2/16 = .125 | 1 | 0 | 0 | 1 | 0 | 1 | 0 | 1 |
| 4 | 2/15 = .133 | 1 | 1 | 0 | 0 | 0 | 1 | 0 | 1 |
| 5 | 2/14 = .143 | 1 | 0 | 0 | 0 | 0 | 1 | 0 | 1 |
| 6 | 2/13 = .154 | 1 | 1 | 0 | 1 | 0 | 0 | 0 | 1 |
| 7 | 2/12 = .167 | 1 | 0 | 0 | 1 | 0 | 0 | 0 | 1 |
| 8 | 2/11 = .182 | 1 | 1 | 0 | 0 | 0 | 0 | 0 | 1 |
| 9 | 2/10 = .20 | 1 | 0 | 0 | 0 | 0 | 0 | 0 | 1 |
| 10 | 4/19 = .211 | 0 | 1 | 1 | 1 | 0 | 1 | 0 | 1 |
| 11 | 4/18 = .222 | 0 | 0 | 1 | 1 | 0 | 1 | 0 | 1 |
| 12 | 4/17 = .235 | 0 | 1 | 1 | 0 | 0 | 1 | 0 | 1 |
| 13 | 4/16 = .25 | 0 | 0 | 1 | 0 | 0 | 1 | 0 | 1 |
| 14 | 4/15 = .267 | 0 | 1 | 1 | 1 | 0 | 0 | 0 | 1 |
| 15 | 4/14 = .286 | 0 | 0 | 1 | 1 | 0 | 0 | 0 | 1 |
| 16 | 6/20 = .30 | 1 | 0 | 1 | 1 | 0 | 1 | 0 | 1 |
| 17 | 4/13 = .308 | 0 | 1 | 1 | 0 | 0 | 0 | 0 | 1 |
| 18 | 6/19 = .316 | 1 | 1 | 1 | 0 | 0 | 1 | 0 | 1 |
| 19 | 6/18 = .333 | 1 | 0 | 1 | 0 | 0 | 1 | 0 | 1 |
| 20 | 8/23 = .348 | 0 | 1 | 0 | 1 | 1 | 1 | 0 | 1 |
| 21 | 6/17 = .353 | 1 | 1 | 1 | 1 | 0 | 0 | 0 | 1 |
| 22 | 8/22 = .364 | 0 | 0 | 0 | 1 | 1 | 1 | 0 | 1 |
| 23 | 6/15 = .375 | 1 | 0 | 1 | 1 | 0 | 0 | 0 | 1 |
| 24 | 8/21 = .381 | 0 | 1 | 0 | 0 | 1 | 1 | 0 | 1 |
| 25 | 8/20 = .40 | 0 | 0 | 0 | 0 | 1 | 1 | 0 | 1 |
| 26 | 10/24 = .417 | 1 | 0 | 0 | 1 | 1 | 1 | 0 | 1 |
| 27 | 8/19 = .421 | 0 | 1 | 0 | 1 | 1 | 0 | 0 | 1 |
| 28 | 6/14 = .429 | 1 | 0 | 1 | 0 | 0 | 0 | 0 | 1 |
| 29 | 7/16 = .438 | 0 | 0 | 0 | 1 | 1 | 1 | 1 | 1 |
| 30 | 8/18 = .444 | 0 | 0 | 0 | 1 | 1 | 0 | 0 | 1 |
| 31 | 10/22 = .455 | 1 | 0 | 0 | 0 | 1 | 1 | 0 | 1 |
| 32 | 12/26 = .462 | 0 | 0 | 1 | 0 | 1 | 1 | 0 | 1 |
| 33 | 8/17 = .471 | 0 | 1 | 0 | 0 | 1 | 0 | 0 | 1 |
| 34 | 10/21 = .476 | 1 | 1 | 0 | 1 | 1 | 0 | 0 | 1 |
| 35 | 12/25 = .480 | 0 | 1 | 1 | 0 | 1 | 1 | 0 | 1 |
| 36 | 14/29 = .483 | 1 | 1 | 1 | 1 | 1 | 1 | 0 | 1 |

TABLE II-continued
WATER MIXTURE

| POSITION NO. | PROPORTION OF HOT WATER | H1 | C1 | H2 | C2 | H3 | C3 | H4 | C4 |
|---|---|---|---|---|---|---|---|---|---|
| 37 | 14/28 = .50 | 1 | 0 | 1 | 1 | 1 | 1 | 0 | 1 |
| 38 | 16/31 = .516 | 0 | 1 | 0 | 1 | 0 | 1 | 1 | 1 |
| 39 | 14/27 = .519 | 1 | 1 | 1 | 0 | 1 | 1 | 0 | 1 |
| 40 | 12/23 = .522 | 0 | 1 | 1 | 1 | 1 | 0 | 0 | 1 |
| 41 | 10/19 = .526 | 1 | 1 | 0 | 0 | 1 | 0 | 0 | 1 |
| 42 | 16/30 = .533 | 0 | 0 | 0 | 1 | 0 | 1 | 1 | 1 |
| 43 | 14/26 = .538 | 1 | 0 | 1 | 0 | 1 | 1 | 0 | 1 |
| 44 | 12/22 = .545 | 0 | 0 | 1 | 1 | 1 | 0 | 0 | 1 |
| 45 | 10/29 = .552 | 0 | 1 | 0 | 0 | 0 | 1 | 1 | 1 |
| 46 | 10/18 = .556 | 1 | 0 | 0 | 0 | 1 | 0 | 0 | 1 |
| 47 | 14/25 = .560 | 1 | 1 | 1 | 1 | 1 | 0 | 0 | 1 |
| 48 | 18/32 = .563 | 1 | 0 | 0 | 1 | 0 | 1 | 1 | 1 |
| 49 | 16/28 = .571 | 0 | 0 | 0 | 0 | 0 | 1 | 1 | 1 |
| 50 | 18/31 = .581 | 1 | 1 | 0 | 0 | 0 | 1 | 1 | 1 |
| 51 | 14/24 = .583 | 1 | 0 | 1 | 1 | 1 | 0 | 0 | 1 |
| 52 | 20/34 = .588 | 0 | 0 | 1 | 1 | 0 | 1 | 1 | 1 |
| 53 | 16/27 = .593 | 0 | 1 | 0 | 1 | 0 | 0 | 1 | 1 |
| 54 | 22/37 = .595 | 1 | 1 | 1 | 1 | 0 | 1 | 1 | 1 |
| 55 | 18/30 = .60 | 1 | 0 | 0 | 0 | 0 | 1 | 1 | 1 |
| 56 | 20/33 = .606 | 0 | 1 | 1 | 0 | 0 | 1 | 1 | 1 |
| 57 | 14/23 = .609 | 1 | 1 | 1 | 0 | 1 | 0 | 0 | 1 |
| 58 | 22/36 = .611 | 1 | 0 | 1 | 1 | 0 | 1 | 1 | 1 |
| 59 | 16/26 = .615 | 0 | 0 | 0 | 1 | 0 | 0 | 1 | 1 |
| 60 | 18/29 = .621 | 1 | 1 | 0 | 1 | 0 | 0 | 1 | 1 |
| 61 | 20/32 = .625 | 0 | 0 | 1 | 0 | 0 | 1 | 1 | 1 |
| 62 | 22/35 = .629 | 1 | 1 | 1 | 0 | 0 | 1 | 1 | 1 |
| 63 | 24/38 = .632 | 0 | 0 | 0 | 1 | 1 | 1 | 1 | 1 |
| 64 | 26/41 = .634 | 1 | 1 | 0 | 1 | 1 | 1 | 1 | 1 |
| 65 | 14/22 = .636 | 1 | 0 | 1 | 0 | 1 | 0 | 0 | 1 |
| 66 | 16/25 = .640 | 0 | 1 | 0 | 0 | 0 | 0 | 1 | 1 |
| 67 | 18/28 = .643 | 1 | 0 | 0 | 1 | 0 | 0 | 1 | 1 |
| 68 | 20/31 = .645 | 0 | 1 | 1 | 1 | 0 | 0 | 1 | 1 |
| 69 | 22/34 = .647 | 1 | 0 | 1 | 0 | 0 | 1 | 1 | 1 |
| 70 | 24/37 = .649 | 0 | 1 | 0 | 0 | 1 | 1 | 1 | 1 |
| 71 | 26/40 = .65 | 1 | 0 | 0 | 1 | 1 | 1 | 1 | 1 |
| 72 | 28/43 = .651 | 0 | 1 | 1 | 1 | 1 | 1 | 1 | 1 |
| 73 | 30/45 = .667 | 1 | 1 | 1 | 1 | 1 | 1 | 1 | 1 |
| 74 | 30/44 = .682 | 1 | 0 | 1 | 1 | 1 | 1 | 1 | 1 |
| 75 | 28/41 = .683 | 0 | 1 | 1 | 0 | 1 | 1 | 1 | 1 |
| 76 | 26/38 = .684 | 1 | 0 | 0 | 0 | 1 | 1 | 1 | 1 |
| 77 | 24/35 = .686 | 0 | 1 | 0 | 1 | 1 | 0 | 1 | 1 |
| 78 | 22/32 = .688 | 1 | 0 | 1 | 1 | 0 | 0 | 1 | 1 |
| 79 | 20/29 = .69 | 0 | 1 | 1 | 0 | 0 | 0 | 1 | 1 |
| 80 | 18/26 = .692 | 1 | 0 | 0 | 0 | 0 | 0 | 1 | 1 |
| 81 | 16/23 = .696 | 0 | 1 | 0 | 1 | 0 | 1 | 1 | 0 |
| 82 | 30/43 = .698 | 1 | 1 | 1 | 0 | 1 | 1 | 1 | 1 |
| 83 | 28/40 = .70 | 0 | 0 | 1 | 0 | 1 | 1 | 1 | 1 |
| 84 | 26/37 = .703 | 1 | 1 | 0 | 1 | 1 | 0 | 1 | 1 |
| 85 | 24/34 = .706 | 0 | 0 | 0 | 1 | 1 | 0 | 1 | 1 |
| 86 | 22/31 = .71 | 1 | 1 | 1 | 0 | 0 | 0 | 1 | 1 |
| 87 | 20/28 = .714 | 0 | 0 | 1 | 0 | 0 | 0 | 1 | 1 |
| 88 | 28/39 = .718 | 0 | 1 | 1 | 1 | 1 | 0 | 1 | 1 |
| 89 | 18/25 = .72 | 1 | 1 | 0 | 1 | 0 | 1 | 1 | 0 |
| 90 | 26/36 = .722 | 1 | 0 | 0 | 1 | 1 | 0 | 1 | 1 |
| 91 | 24/33 = .727 | 0 | 1 | 0 | 0 | 1 | 0 | 1 | 1 |
| 92 | 30/41 = .732 | 1 | 1 | 1 | 1 | 1 | 0 | 1 | 1 |
| 93 | 22/30 = .733 | 1 | 0 | 1 | 0 | 0 | 0 | 1 | 1 |
| 94 | 28/38 = .737 | 0 | 0 | 1 | 1 | 1 | 0 | 1 | 1 |
| 95 | 20/27 = .741 | 0 | 1 | 1 | 1 | 0 | 1 | 1 | 0 |
| 96 | 26/35 = .743 | 1 | 1 | 0 | 0 | 1 | 0 | 1 | 1 |
| 97 | 24/32 = .750 | 0 | 0 | 0 | 0 | 1 | 0 | 1 | 1 |
| 98 | 22/29 = .759 | 1 | 1 | 1 | 1 | 0 | 1 | 1 | 0 |
| 99 | 16/21 = .762 | 0 | 1 | 0 | 0 | 0 | 1 | 1 | 0 |
| 100 | 26/34 = .765 | 1 | 0 | 0 | 0 | 1 | 0 | 1 | 1 |
| 101 | 20/26 = .769 | 0 | 1 | 0 | 1 | 1 | 1 | 1 | 0 |
| 102 | 24/31 = .774 | 1 | 0 | 1 | 0 | 1 | 1 | 0 | 0 |
| 103 | 28/36 = .778 | 0 | 0 | 1 | 0 | 1 | 0 | 1 | 1 |
| 104 | 18/23 = .783 | 1 | 1 | 0 | 0 | 0 | 1 | 1 | 0 |
| 105 | 22/28 = .786 | 1 | 0 | 1 | 0 | 1 | 1 | 0 | 0 |
| 106 | 26/29 = .788 | 1 | 1 | 0 | 1 | 1 | 0 | 1 | 0 |
| 107 | 30/38 = .789 | 1 | 0 | 1 | 0 | 1 | 0 | 1 | 1 |
| 108 | 23/35 = .80 | 0 | 1 | 1 | 1 | 1 | 1 | 1 | 0 |
| 109 | 30/37 = .811 | 1 | 1 | 1 | 1 | 1 | 1 | 1 | 0 |
| 110 | 26/32 = .813 | 1 | 0 | 0 | 1 | 1 | 1 | 1 | 0 |
| 111 | 22/27 = .815 | 1 | 1 | 0 | 0 | 1 | 1 | 1 | 0 |
| 112 | 18/22 = .818 | 1 | 0 | 0 | 0 | 1 | 1 | 1 | 0 |
| 113 | 28/34 = .824 | 0 | 0 | 1 | 1 | 1 | 1 | 1 | 0 |
| 114 | 24/29 = .828 | 0 | 1 | 0 | 0 | 1 | 1 | 1 | 0 |
| 115 | 30/36 = .833 | 1 | 0 | 1 | 1 | 1 | 1 | 1 | 0 |
| 116 | 26/31 = .839 | 1 | 1 | 0 | 0 | 1 | 1 | 1 | 0 |
| 117 | 16/19 = .842 | 0 | 1 | 0 | 1 | 0 | 0 | 1 | 0 |
| 118 | 22/26 = .846 | 1 | 0 | 1 | 0 | 0 | 1 | 1 | 0 |
| 119 | 28/33 = .848 | 0 | 1 | 1 | 0 | 1 | 1 | 1 | 0 |
| 120 | 24/28 = .857 | 0 | 0 | 0 | 0 | 1 | 1 | 1 | 0 |
| 121 | 26/32 = .867 | 1 | 0 | 0 | 0 | 1 | 1 | 1 | 0 |
| 122 | 20/23 = .870 | 0 | 1 | 1 | 1 | 0 | 0 | 1 | 0 |
| 123 | 28/37 = .875 | 0 | 0 | 1 | 0 | 1 | 1 | 1 | 0 |
| 124 | 22/25 = .886 | 1 | 1 | 1 | 1 | 0 | 0 | 1 | 0 |
| 125 | 30/34 = .882 | 1 | 0 | 1 | 0 | 1 | 1 | 1 | 0 |
| 126 | 24/27 = .889 | 0 | 1 | 0 | 1 | 1 | 0 | 1 | 0 |
| 127 | 26/29 = .897 | 1 | 1 | 0 | 1 | 0 | 1 | 1 | 0 |
| 128 | 18/20 = .90 | 1 | 0 | 0 | 1 | 0 | 0 | 1 | 0 |
| 129 | 28/31 = .903 | 0 | 1 | 1 | 1 | 1 | 0 | 1 | 0 |
| 130 | 20/22 = .909 | 0 | 0 | 1 | 1 | 0 | 0 | 1 | 0 |
| 131 | 22/24 = .917 | 1 | 0 | 1 | 0 | 0 | 1 | 1 | 0 |
| 132 | 24/26 = .923 | 0 | 0 | 0 | 1 | 1 | 0 | 1 | 0 |
| 133 | 26/29 = .929 | 1 | 0 | 0 | 1 | 1 | 0 | 1 | 0 |
| 134 | 28/30 = .933 | 0 | 0 | 1 | 1 | 1 | 0 | 1 | 0 |
| 135 | 30/32 = .935 | 1 | 0 | 1 | 1 | 1 | 0 | 1 | 0 |
| 136 | 16/17 = .941 | 0 | 1 | 0 | 0 | 0 | 0 | 1 | 0 |
| 137 | 18/19 = .947 | 1 | 1 | 0 | 0 | 0 | 0 | 1 | 0 |
| 138 | 20/21 = .952 | 0 | 1 | 1 | 0 | 0 | 0 | 1 | 0 |
| 139 | 27/23 = .957 | 1 | 1 | 1 | 0 | 0 | 0 | 1 | 0 |
| 140 | 24/25 = .960 | 0 | 1 | 0 | 0 | 1 | 0 | 1 | 0 |
| 141 | 26/27 = .963 | 1 | 1 | 0 | 0 | 1 | 0 | 1 | 0 |
| 142 | 28/29 = .966 | 0 | 1 | 1 | 0 | 1 | 0 | 1 | 0 |
| 143 | 30/31 = .969 | 1 | 1 | 1 | 0 | 1 | 0 | 1 | 0 |
| 144 | 30/30 = 1.000 | 1 | 0 | 1 | 0 | 1 | 0 | 1 | 0 |

Once the actual temperature detected by the temperature sensor 116 and the selected or default temperature are equal to within plus or minus about 1.0° F, the combination of valve assembly openings is maintained at that point. However, the temperature continues to be monitored every 0.5 second interval. If the temperature drifts beyond this 1.0° F. error window, another combination of valve assembly openings will be determined to reduce the error immediately so it is within the 1.0° F. error range.

Similarly, if the user should happen to change the previously selected temperature, the control program, during the time it checks for inputs, will determine that a new selected temperature is desired and will take appropriate steps to provide a substantial correspondence between the desired temperature and the actual temperature. In connection with a new selected temperature, in the case in which there is continuous activation of the raise switch of the temperature input 140, the selected temperature will increase one degree each second for the first 3 seconds. After that the rate at which the change occurs increases to one degree approximately every 0.25 second. However, if the selected temperature reaches 110°, the advance in temperature setting will stop for several seconds before going on to higher and possibly hazardous temperatures. Likewise, to reduce the temperature of the water, the lower switch of the selected temperature input 140 is pressed or activated and the temperature will start to decrease continuously one degree per second from the current temperature setting for the first three seconds and then the rate of change will increase to one degree steps for each 0.25 second. Once the user has finished with the shower, the shower switch is turned off thereby causing the control program to deactivate the solenoid assembly associated with the shower valve 120, and the solenoid assemblies associated with any opened valve assemblies 34, 36, thereby causing these valves to be shut off.

With respect to the bath tub or sink, it is filled with water at the desired temperature using the control program in substantially the same manner as utilized in connection with the shower operation. To assist the bather in filling the tub, the electronic controller 10 includes a timer which is activated when the tub switch 152 is turned on. In particular, by means of the control program, the timer is reset to enable it to keep track of the time during which water is filling the tub. The time in the timer is continuously compared with a previously stored time. After the stored time corresponds to the time in the timer, the tub valve 122 will shut off. In the case in which there is no time preset input provided by the user, a default time of 5 minutes is utilized.

Although the present invention has been described as having the foregoing features, further or other features may be utilized. A device or unit could be included in the apparatus to minimize significant or abrupt changes in the temperature of the water exiting the shower head or tub faucet. For example, in those cases where there are abnormal water pressures and/or where there is a significantly great difference between the temperatures of the hot and cold water, highly cyclic, transient water temperatures might be felt by the user of the apparatus until the desired temperature is reached. To alleviate this possibility, a device or unit, such as a section of pipe or a small cylinder having a greater diameter than that of the common output channel 62 would be used so that the water accumulates in this member before exiting the shower head or the tub faucet thereby effectively eliminating abrupt or highly cyclic changes in the temperature of the outputted water. Such a device would preferably be located upstream of the temperature sensor 116.

In addition, although the orifices associated with the hot water valve assemblies have been described as being smaller in size relative to the cold water orifices, the hot water orifices could be the same or greater in size than the cold water orifices. Greater sized hot water orifices could be useful in providing a biasing of the water temperature. That is, because a typical bather or shower user desires a water temperature in the range of about 100° F.–110° F., it may be desirable to provide a bias whereby greater control over the water temperature is achieved near this range of water temperatures. Specifically, more different temperatures would be available in a predetermined range of water temperatures. This is accomplished by having more valve combinations in this range. As a result, better resolution of water temperatures is achieved. For example, instead of a 1° F. difference between successive valve combinations, a 0.5° F. difference can be achieved in a desired range of water temperatures. Biasing could also be accomplished by premixing the hot and cold water before the water is inputted to one or more of the valve assemblies.

Proper operation of the present invention also does not require that the number of hot water valve assemblies be equal to the number of cold water valve assemblies. The number of hot water valve assemblies may be less or greater than the number of cold water valve assemblies. The number of hot and cold valve assemblies can also be less or greater than the six valve assemblies discussed in connection with the illustrated embodiment.

As previously discussed, the preferred method for providing a selected combination of valve openings includes moving more than one step or position from a current position in the Water Mixture Table I. However, the control program could be implemented to reduce any difference between the actual water temperature and the desired water temperature in an incremental manner. Specifically, in the case of the actual water temperature being different from the desired water temperature, different valve assemblies could be opened in successive steps until the actual temperature of the water corresponds to the desired temperature. Each successive step, having a different valve combination, results in an actual water temperature which is different from the previous water temperature, and which is also less than any other possible temperature change available using any other possible combination of valve openings. In such a manner, the electronic controller is able to cause the least amount of water temperature change between a first combination of valve openings and the next selected combination of valve openings that is available as compared with all other combinations of valve openings which could be selected.

Finally, although the discussion directed to the correlation between combinations of valve openings and a proportion of hot water to cold water has been discussed with reference to "tables," it should be appreciated that such correlation information can be stored in memory in any desired fashion so long as the control program is able to properly access and use the information in order to reduce the difference between the actual temperature and the desired temperature.

In view of the foregoing detailed description, a number of advantages of the present invention are readily discerned. A water temperature control system is provided having a particular application as part of a shower and bath system. The invention includes on/off valve assemblies which are relatively inexpensive in comparison with proportional valves. Relatedly, such valve assemblies do not require the use of stepper motors or any other kind of motor. Such on/off valves can also be inexpensively and easily replaced if they should fail. The invention includes a compactly configured manifold having a number of channels through which water is able to flow to and from the valve assemblies, yet large enough to permit proper mixing of the hot and cold water. Orifices are sized to provide flow rates in a binary relationship. The orifices are formed in orifice plates compactly disposed adjacent to valve openings. The hot water associated orifices are relatively smaller in size than corresponding cold water associated orifices so that an accurate, desired water temperature can be achieved. To assure that the orifices remain free of particles and are not blocked off, the system includes a strainer block for filtering the water. In connection with the controlling of the water temperature, a control program is provided that accesses and uses a water mixture table stored in memory whereby a different combination of valve openings can be implemented without cycling through other combinations of valve openings. As a consequence, the desired or selected water temperature can be more rapidly achieved. Lastly, the control program includes a number of features that can be utilized by the operator using various input controls.

Although the present invention has been described with reference to particular embodiments, it should be understood that further variations and modifications can be effected within the spirit and scope of the invention.

What is claimed is:

1. An apparatus for controlling the temperature of liquid such as water, comprising:
    a plurality of on/off valve means, some of said on/off valve means including hot water on/off valve means for receiving relatively hot water therethrough and some of said on/off valve means including cold water on/off valve means for receiving relatively cold water therethrough, each of said on/off valve means being either fully opened or fully closed;
    a plurality of orifices, each of said orifices being associated with at least one of said on/off valve means;
    means for causing selected ones of said on/off valve means to open;
    monitoring means for sensing water temperature; and
    manifold means including a body for housing each of said plurality of orifices and each of said plurality of on/off valve means, said manifold means including at least a first input channel means for providing a path for water to at least a number of said hot water on/off valve means and at least a second input channel means for carrying water to a number of said cold water on/off valve means, said manifold means further including a first output chnnel means, which is separate from and unaligned with said first input channel means and substantially parallel thereto, and a second output channel means, which is separate from and unaligned with said second input channel means and substantially parallel thereto, said manifold means also including a common output channel for receiving water from each of said first and second output channel means, at least two of said number of hot water on/off valve means being disposed in said body of said manifold means on substantially opposing sides of said first input channel means wherein hot water is initially received adjacent to said two hot water on/off valve means at substantially the same time and at least two of said number of cold water on/off valve means being disposed in said body of said manifold means on substantially opposing sides of said second input channel means wherein cold water is initially received adjacent to said two cold water on/off valve means at substantially the same time.

2. An apparatus, as claimed in claim 1, wherein:
    at least one of said on/off valve means includes a valve opening and at least one of said orifices is positioned upstream of said valve opening.

3. An apparatus, as claimed in claim 1, wherein:
    said body of said manifold means is an integral body and said first output channel means includes a first output channel and a first linking output channel substantially perpendicular to said first output channel.

4. An apparatus, as claimed in claim 1, wherein:
    said first input channel means carries water in a first direction, said first output channel means carries water in a second direction, and said common output channel carries water in said first direction.

5. An apparatus, as claimed in claim 1, wherein:
    said hot water on/off valve means includes a first hot water on/off valve, a second hot water on/off valve, and a third hot water on/off valve and wherein said three valves are serially arranged in said manifold means such that water flows adjacent to said first hot water on/off valve and said second hot water on/off valve before the same water flows adjacent to said third hot water on/off valve.

6. An apparatus, as claimed in claim 1, wherein:
    said means for causing said on/off valve means to open includes solenoid means supported on a surface of said manifold means.

7. An apparatus, as claimed in claim 17, wherein:
    said monitoring means includes a bore formed in said manifold means for receiving a temperature sensing element.

8. An apparatus, as claimed in claim 1, wherein:
    said plurality of on/off valve means includes a first on/off valve means having a valve opening and at least one of said orifices is spaced from, unaligned with, but substantially parallel to said valve opening.

9. An apparatus, as claimed in claim 1, wherein:
    each of said orifices, that is associated with one of said hot water on/off valve means, is different in size from the other of said orifices associated with said hot water on/off valve means and each of said orifices, that is associated with one of said cold water on/off valve means, is different in size from the other of said orifices associated with said cold water on/off valve means, the smallest in size orifice associated with said hot water on/off valve means being smaller in size than the smallest in size of said orifices associated with said cold water on/off valve means.

10. An apparatus, as claimed in claim 8, wherein:
    said first on/off valve means includes a seal member movable in response to the pressure of the water and at least one of said orifices is formed in an orifice plate and wherein said seal member is adjacent to said orifice plate.

11. An apparatus, as claimed in claim 1, wherein:
    said plurality of on/off valve means includes at least a first on/off valve means having a valve opening and a first of said plurality of orifices is associated with said valve opening wherein water moves through said valve opening in a direction opposite that of the movement of the same water through said first orifice.

12. An apparatus, as claimed in claim 1, wherein:
    said first input channel means includes a first input channel and a second input channel, said first input channel carrying hot water to some of said hot water on/off valve means and said second input channel carrying water to others of said hot water on/off valve means.

13. An apparatus, as claimed in claim I, wherein:
    a first of said plurality of on/off vlave means includes a housing having a stem and said means for causing includes a plunger and a spring positioned in said stem.

14. An apparatus for controlling the temperature of a liquid such as water, comprising:
    manifold means having an outer surface and a plurality of channels through which water flows;
    a plurality of on/off valve means, some of said on/off valve means for receiving relatively hot water therethrough and some of said on/off valve means for receiving relatively cold water therethrough, each of said on/off valves means being either fully opened or fully closed, each of said on/off valve means being held by said manifold means;

a plurality of orifices, each of said orifices communicating with one of said on/off valve means, the sizes of said orifices communicating with said hot water on/off valve means being in a predetermined size relationship relative to the other of said orifices Communicating with said hot water on/off valve means, said predetermined size relationship being a binary relationship wherein the amount of hot water outputted by each of said orifices being in a binary relationship to the amount of hot water outputted by each of said other orifices communicating with said hot water on/off valve means, each of said orifices communicating with one of said cold water on/off valve means being in a predetermined size relationship relative to the other of said orifices communicating with said cold water on/off valve means, said predetermind size relationship being a binary relationship wherein the amount of cold water outputted by each of said orifices being in a binary relationship to the amount of cold water outputted by each of said other orifices communicating with said cold water on/off valve means, each of said orifices communicating with said hot water on/off valve means being of a different size than each of said corresponding orifices communicating with said cold water on/off valve means;

temperature monitoring means in operative association with said manifold means;

actuating means for use in causing said on/off valve means to open, said actuating means being supported on said outer surface of said manifold means; and control means responsive to said temperature monitoring means for controlling the opening/closing of each of said on/off valve means.

15. An apparatus, as claimed in claim 14, whrein:
said temperature monitoring means includes a bore formed in said manifold means communicating with one of said channels.

16. An apparatus, as claimed in claim 14, wherein:
at least a first of said plurality of orifices is formed in an orifice plate and at least a first of said on/off valve means includes a valve opening, and wherein said valve opening is adjacent to, and on the downstream side of, said first orifice.

17. An apparatus, as claimed in claim 14, wherein;
at least a first and second of said plurality of orifices is formed in a single orifice plate.

* * * * *